US006397281B1

(12) United States Patent
MacLellan et al.

(10) Patent No.: US 6,397,281 B1
(45) Date of Patent: *May 28, 2002

(54) BUS ARBITRATION SYSTEM

(75) Inventors: Christopher S. MacLellan, Norwood; John K. Walton, Mendon, both of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,807

(22) Filed: Dec. 23, 1997

(51) Int. Cl.[7] .............................................. G06F 12/00
(52) U.S. Cl. ...................... 710/113; 710/114; 710/116; 710/115; 711/114; 711/154; 711/158
(58) Field of Search ................................ 710/113, 114, 710/115, 116, 117, 118; 711/114, 154, 158

(56) References Cited

U.S. PATENT DOCUMENTS

| | | | | |
|---|---|---|---|---|
| 4,873,626 A | * | 10/1989 | Gifford ........................ | 364/200 |
| 5,193,175 A | * | 3/1993 | Cutts, Jr. et al. ............ | 395/575 |
| 5,414,818 A | * | 5/1995 | Henson et al. ............... | 395/325 |
| 5,787,265 A | | 7/1998 | Leshem ........................ | 395/293 |
| 5,872,983 A | * | 2/1999 | Walsh et al. ................. | 710/100 |
| 5,890,003 A | * | 3/1999 | Cutts, Jr. et al. ............ | 395/736 |

* cited by examiner

*Primary Examiner*—Matthew Kim
*Assistant Examiner*—Pierre M. Vital
(74) *Attorney, Agent, or Firm*—Daly, Crowley & Mofford, LLP

(57) ABSTRACT

A data storage system includes a plurality of control/data buses. A memory section is coupled to the plurality of control/data buses. The memory section includes a memory and a plurality of control logic sections interconnected through an arbitration bus. Each one of the control logic sections is coupled between a corresponding one of the control/data buses and the memory. Each one of such control logic sections includes a control logic for controlling transfer of data between the memory and the one of the plurality of control/data buses coupled to said one of the logic sections. The control logic is adapted to produce a control/data bus request for the one of the control/data buses coupled thereto and is adapted to effect the transfer in response to a control/data bus grant fed to the control logic. Each one of the control logic sections also includes a bus arbitration section coupled to the arbitration bus. Each one of the bus arbitration sections is adapted to: (1) receive a control/data bus request from the control logic in such one of the control logic sections and from the other control logic sections coupled to such arbitration bus; (2) grant access to the control/data bus to one of the control logic sections in accordance with the control/data bus requests coupled to the bus arbitration section; (3) receive control/data bus grants from the other control logic sections coupled to such arbitration bus; and (4) distribute the control/data bus request produced by the control logic in said control logic section to the other control logic sections coupled to the arbitration bus. The bus arbitration section has fault tolerance.

12 Claims, 9 Drawing Sheets

BUS ARBITRATION SYSTEM

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers and disk controllers, addressable cache memories. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set of the disk controllers is connected to one bus and another set of the disk controllers is connected to the other bus. Likewise, one set of the CPU controllers is connected to one bus and another set of the CPU controllers is connected to the other bus. The cache memories are connected to both buses. Each one of the buses provides data, address and control information.

Thus, the use of two buses provides a degree of redundancy to protect against a total system failure in the event that the controllers, or disk drives connected to one bus fail.

SUMMARY OF THE INVENTION

In accordance with the present invention, a data storage system is provided. The data storage system includes a plurality of control/data buses. A memory section is coupled to the plurality of control/data buses. The memory section includes a memory and a plurality of control logic sections interconnected through an arbitration bus. Each one of the control logic sections is coupled between a corresponding one of the control/data buses and the memory. Each one of such control logic sections includes a control logic for controlling transfer of data between the memory and the one of the plurality of control/data buses coupled to said one of the logic sections. The control logic is adapted to produce a control/data bus request for the one of the control/data buses coupled thereto and is adapted to effect the transfer in response to a control/data bus grant fed to the control logic. Each one of the control logic sections also includes a bus arbitration section coupled to the arbitration bus. Each one of the bus arbitration sections is adapted to: (1) receive a control/data bus request from the control logic in such one of the control logic sections and from the other control logic sections coupled to such arbitration bus; (2) grant access to the control/data bus to one of the control logic sections in accordance with the control/data bus requests coupled to the bus arbitration section; (3) receive control/data bus grants from the other control logic sections coupled to such arbitration bus; and (4) distribute the control/data bus request produced by the control logic in said control logic section to the other control logic sections coupled to the arbitration bus.

In accordance with another feature of the invention, each one of the bus arbitration sections includes a majority gate fed by the control/data bus grants received from the other control logic sections for producing an internal control/data bus grant when a majority of the control logic sections indicate that the said one of the bus arbitration sections has been granted the control/data bus.

In accordance with another feature of the invention, each one of the bus arbitration sections includes an internal arbitrator response to control/data bus request from the plurality of control logic sections and provides a control/data bus grant to one of the plurality of control logic sections selectively in accordance with a pre-determined criteria.

In accordance with another feature of the invention, each one of the bus arbitration sections includes an internal arbitrator response to control/data bus request from the plurality of control logic sections and wherein each one of the plurality of control logic sections provides a control/data bus grant to one of the plurality of control logic sections selectively in accordance with a common pre-determined criteria.

BRIEF DESCRIPTION OF THE DRAWING

These and other features of the invention will become more readily apparent when read together with the accompanying drawings, in which.

DESCRIPTION OF THE PREFERRED EMBODIMENTS

Figure 1:
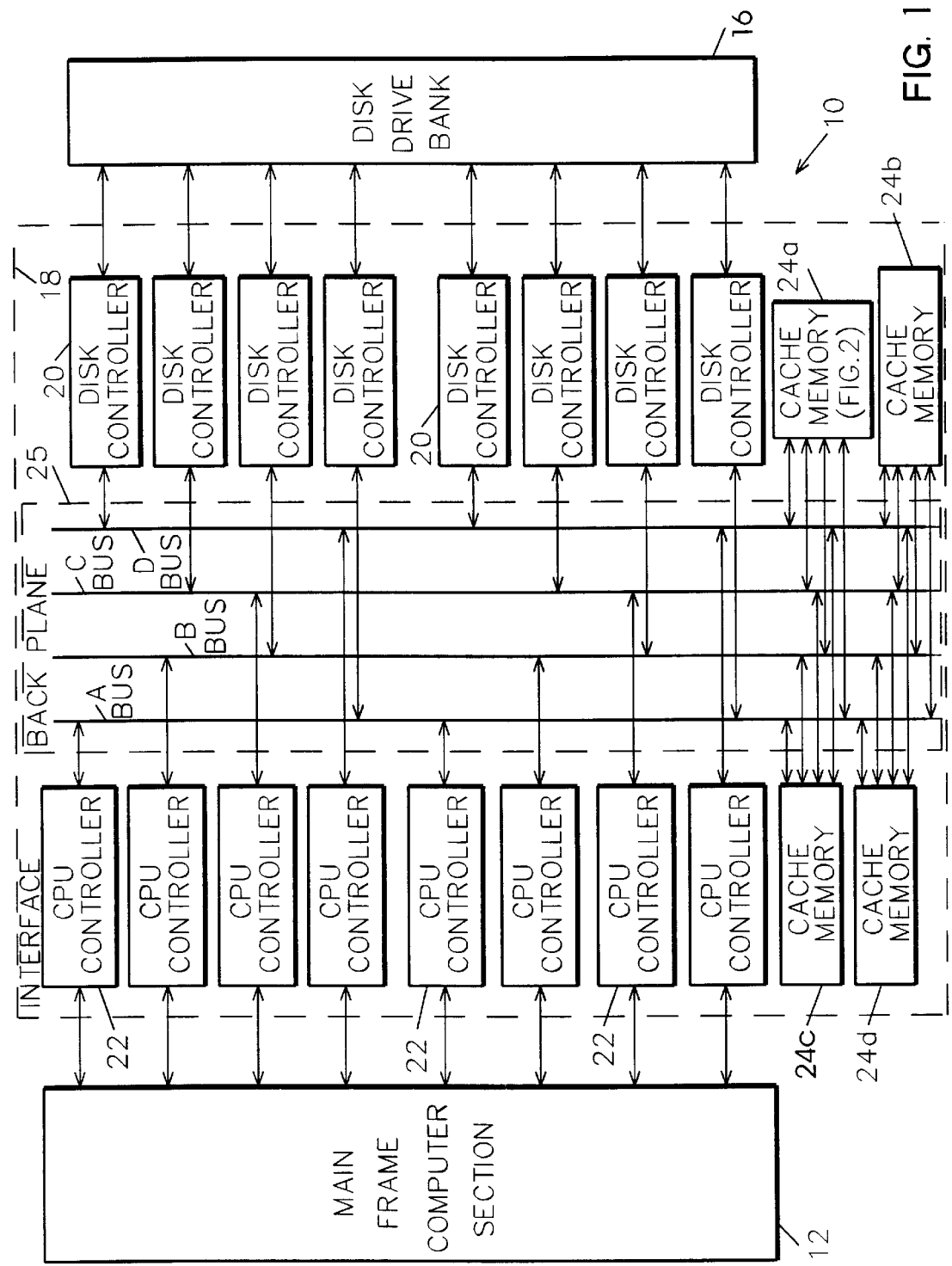
FIG. 1 is a block diagram of a computer system using a data storage system in accordance with the invention.

Referring now to FIG. 1, a computer system 10 is shown. The computer system 10 includes a main frame computer section 12 having main frame processors 14 for processing data. Portions of the processed data are stored in, and retrieved data from, a bank 16 of disk drives through an interface 18.

The interface 18 includes disk controllers 20, central processor unit (CPU) controllers 22 and addressable cache memories 24a, 24b, 24c, and 24d electrically interconnected through a backplane 25, here four control/data buses; i.e., an A bus, a B bus, a C bus, and a D bus, as shown. The cache memories 24a, 24b, 24c and 24d are hereinafter sometimes referred to as memory section 24a, 24b, 24c and 24d, respectively.

More particularly, in order to provide data integrity in case of a failure in a disk controller 20 or CPU controller 22, the four of control/data buses (i.e., A bus, B bus, C bus and D bus) are provided. One portion of the disk controllers 20 is connected to one of the A bus, a second portion to the B bus, a third portion to the C bus and the remaining portion to the D bus. Likewise, one portion of the CPU controllers 22 is connected to the A bus, a second portion to the B bus, a third portion to the C bus and the remaining portion to the D bus. The cache memories 24a, 24b, 24c and 24d are connected to all four control/data buses, (i.e., the A bus, the B bus, the C bus and the D bus) as shown.

Each one of the controllers 20, 22 is adapted to assert on the control/data bus coupled thereto during a controller initiated control/data bus assert interval: (a) an memory address; and (b) a command, such command including: (i) either a write operation request or a read operation request; and, (ii) when a write operation is requested during a subsequent control/data bus grant interval, data and bus write clock pulses. A timing protocol suitable for use in the system 10 is described in co-pending patent application entitled "TIMING PROTOCOL FOR A DATA STORAGE SYSTEM", inventor John K. Walton, filed on the same date as this application, assigned to the same assignee as the present invention, the entire subject mater thereof being incorporated herein by reference.

Figure 2:
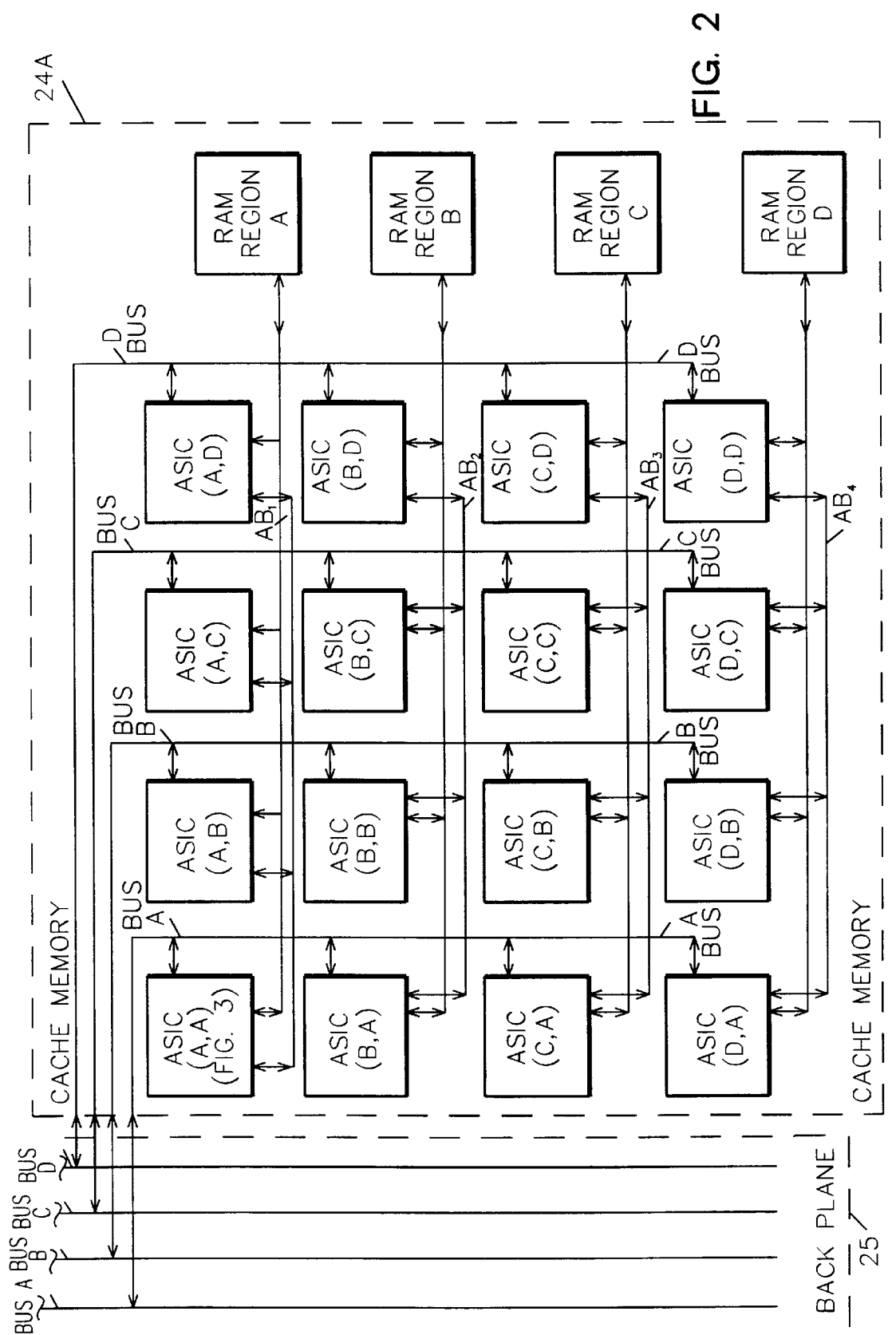
FIG. 2 is a block diagram of an exemplary one of a plurality of cache memories used in the system of FIG. 1.
Figure 5:
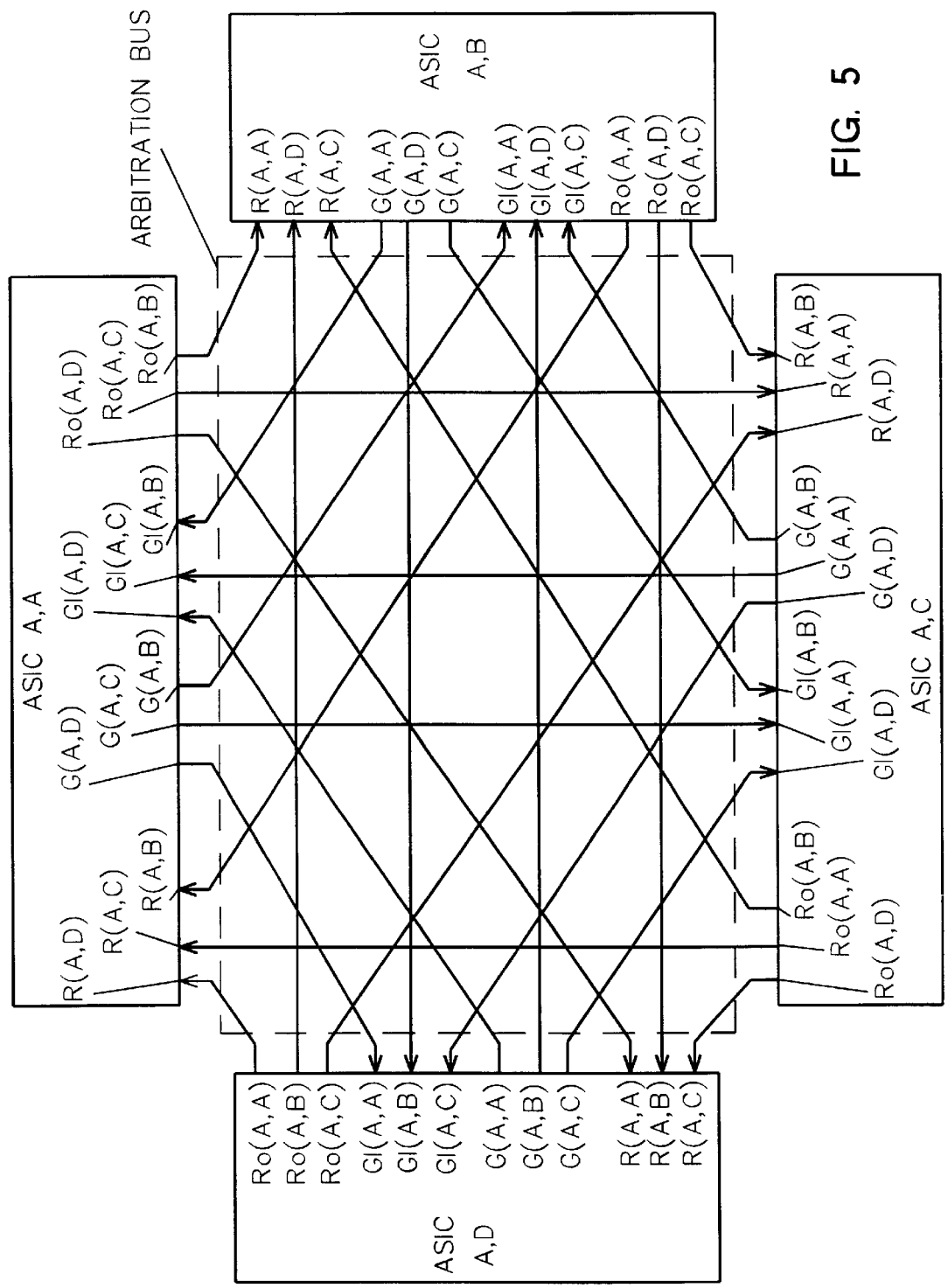
FIG. 5 is a block diagram showing a plurality of the control logic sections of FIG. 3 interconnected through an arbitration bus.

An exemplary one of the memory sections 24a–24d, here memory section 24a is shown in detail in FIG. 2. Such memory section 24a includes a plurality of, here four random access memory (RAM) regions (i.e. RAM region A, RAM region B, RAM region C and RAM region D, as shown, and a matrix of rows and columns of control logic sections, here Application Specific Integrated circuits (ASICs), i.e, control logic section ASIC A,A . . . control logic section ASIC D,D. Each one of the rows of control logic sections ASIC A,A . . . ASIC D,D is coupled to a corresponding one of the four control/data buses A bus, B bus, C bus and D bus and each one of the rows of the control logic sections ASIC A,A . . . ASIC D,D is coupled to a corresponding one of the four RAM regions, RAM region A . . . RAM region D, as indicated. More particularly, here there are four rows of control logic section ASICs. The first row includes ASICs A,A; A,B; A,C; and A,D each being coupled to the RAM region A. The second row includes ASICs B,A; B,B; B,C; and B,D each being coupled to the RAM region B. The third row includes ASICs C,A; C,B; C,C; and C,D each being coupled to the RAM region C. The fourth row includes ASICs D,A; D,B; D,C; and D,D each being coupled to the RAM region D. Further, the control logic sections ASIC A,A . . . ASIC D,D in each of the four rows thereof are interconnected through an arbitration bus. Thus, the first row of ASICs A,A; A,B; A,C; and A,D are interconnected by arbitration bus $AB_1$. The second row of ASICs B,A; B,B; B,C; and B,D are interconnected by arbitration bus $AB_2$. The third row of ASICs C,A; C,B; C,C; and C,D are interconnected by arbitration bus $AB_3$. The fourth row of ASICs D,A; D,B; D,C; and D,D are interconnected by arbitration bus $AB_4$, as indicated. The interconnection of the control logic sections (i.e. ASICs A,A-A,D; B,A-B,D; C,A-C,D; and, D,A-D,D in each of the rows thereof through the one of the four arbitration buses $AB_1$–$AB_4$, respectively, will be described in more detail in connection with FIG. 5 for an exemplary row, here the first row with ASICs A,A; A,B; A,C and A,D. Suffice it to say here, however, that each one of the RAM regions (i.e., RAM regions A–D) is coupled between to the four control/data buses (i.e., A bus, B bus, C bus and D bus) through a corresponding one of the four control logic sections ASICs A,A . . . D,D in the one of the rows of control logic sections ASICs A,A . . . D,D coupled to such RAM region, as described above.

Each one of the four columns of control logic section ASICs is coupled to a coupled to a corresponding one of the control/data buses. More particularly, a first column of control logic sections (i.e., ASICs A,A; B,A; C,A and D,A) are coupled to the A bus. A second column of control logic sections (i.e., ASICs A,B; B,B; C,B and D,B) are coupled to the B bus. A third column of control logic sections (i.e., ASICs A,C; B,C; C,C and D,C) are coupled to the C bus. A fourth column of control logic sections (i.e., ASICs A,D; B,D; C,D and D,D) are coupled to the D bus.

Figure 4:
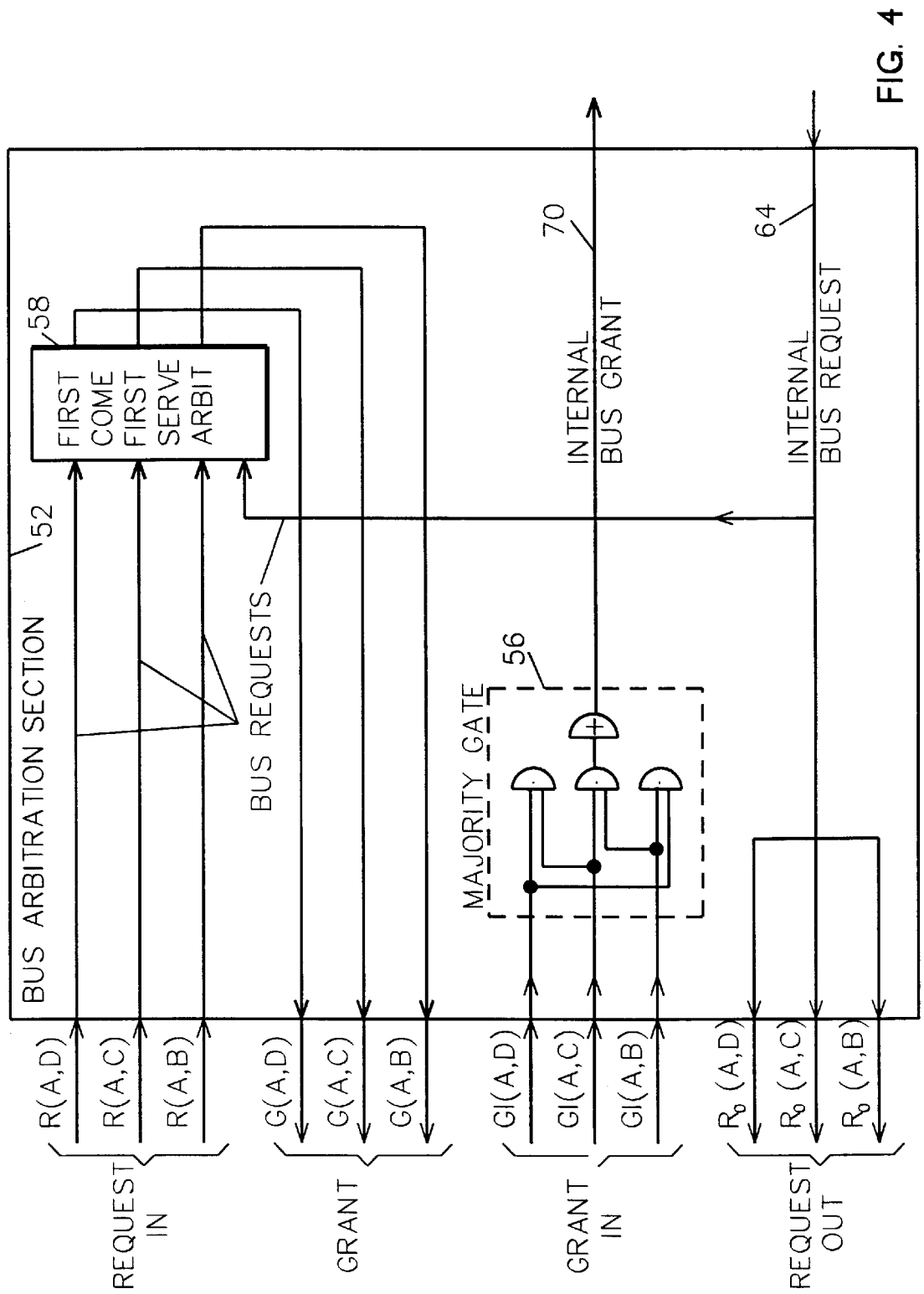
FIG. 4 is a block diagram of a bus arbitration section used in the control logic section of FIG. 3.

Each one of such control logic sections ASICs A,A-D,D is identical in construction, an exemplary one thereof, here control logic section ASIC A,A being shown in detail in FIG. 4 to include a control logic 50 having control logic and a buffer memory as described in the above-referenced co-pending patent application entitled "TIMING PROTOCOL FOR A DATA STORAGE SYSTEM" for controlling transfer of data between the memory and the one of the plurality of control/data buses (i.e., A bus, bus B, C bus and D bus) coupled to the control logic section ASIC A,A. The control logic section ASIC A,A is adapted to produce a control/data bus request for the one of the control/data buses coupled thereto (here RAM region A) and is adapted to effect the transfer in response to a control/data bus grant fed to the control logic section (here ASIC A,A) in accordance with the protocol described in the above-referenced, co-pending application entitled "TIMING PROTOCOL FOR A DATA STORAGE SYSTEM". The control logic section ASIC A,A also includes a bus arbitration section 52 coupled to one of the four arbitration bus $AB_1$–$AB_4$ here to arbitration bus $AB_1$. The bus arbitration section 52 will be described in more detail in connection with FIG. 4. Suffice it to say here, however, that the bus arbitration section 52 is adapted to: (1) receive a control/data bus request from the control logic in such one of the control logic sections ASICs A,A-A,D in the row thereof and from the other control logic sections coupled to such arbitration bus $AB_1$; (2) grant access to the control/data bus to one of the control logic sections ASICs A,A-A,D in accordance with the control/data bus requests coupled to the bus arbitration section 52; (3) receive control/data bus grants from the other control logic sections ASICs A,B-A,D coupled to such arbitration bus AB₁; and (4) distribute the control/data bus request produced by the control logic sections ASICs A,A-D,D to the other control logic sections ASICs coupled to the arbitration bus AB₁.

Figure 3:
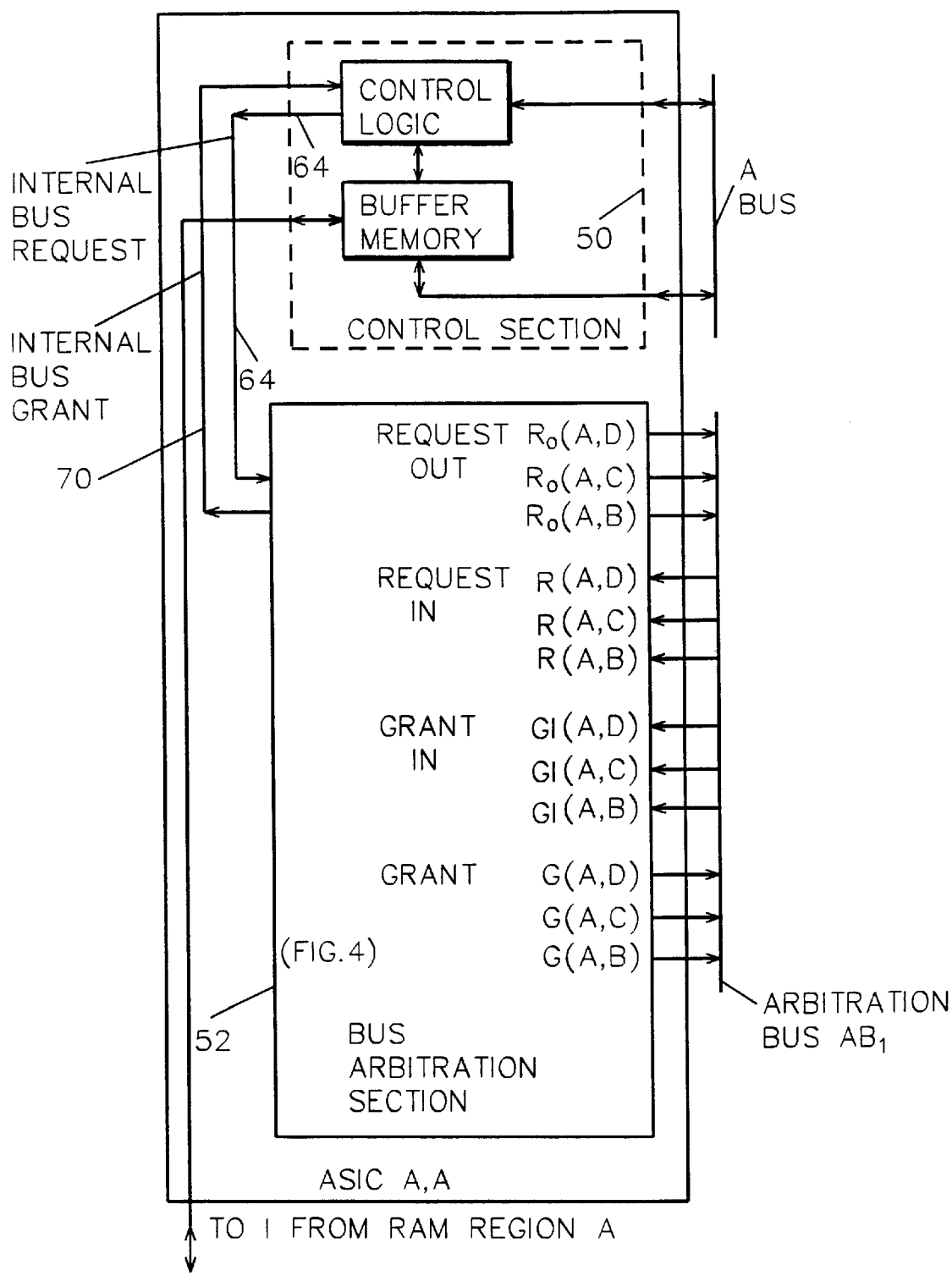
FIG. 3 is a block diagram of a control logic section used in the exemplary one of the cache memories of FIG. 2.

Each one of the bus arbitration sections 52 in each of the control logic sections ASICs A,A-A,D is identical in construction. An exemplary one thereof, here the bus arbitration section 52 in control logic section ASIC A,A (FIG. 3) includes a majority gate 56 fed by the control/data bus grants received from the other control logic sections ASICs A,B-A,D in the row thereof for producing an internal control/data bus grant when a majority of the control logic sections ASICS A,A-A,D indicate that the said one of the bus arbitration sections 52 has been granted the control/data bus. More particularly, the bus arbitration section 52 includes an internal arbitrator 58 response to control/data bus request from the plurality of control logic sections ASICs A,A-A,D and provides a control/data bus grant (i.e., here logic 1) to one of the plurality of control logic sections ASICs A,A-A,D selectively in accordance with a pre-determined criteria. Here, the pre-determined criteria is a "first-come/first-serve" criteria. That is, the control logic sections ASICS A,A-A,D in the row thereof are granted the request in the order requested. It should be noted that each one of the bus arbitration sections 52 includes the internal arbitrator 58 responsive to control/data bus requests from the plurality of control logic sections ASICs A,A-A,D. Each one of the plurality of control logic sections ASICs A,A-A,D provides a control/data bus grant to one of the plurality of control logic sections ASICs in the row thereof selectively in accordance with a common (i.e., the same, here "first-come/first-serve" criteria.)

Figure 5A:
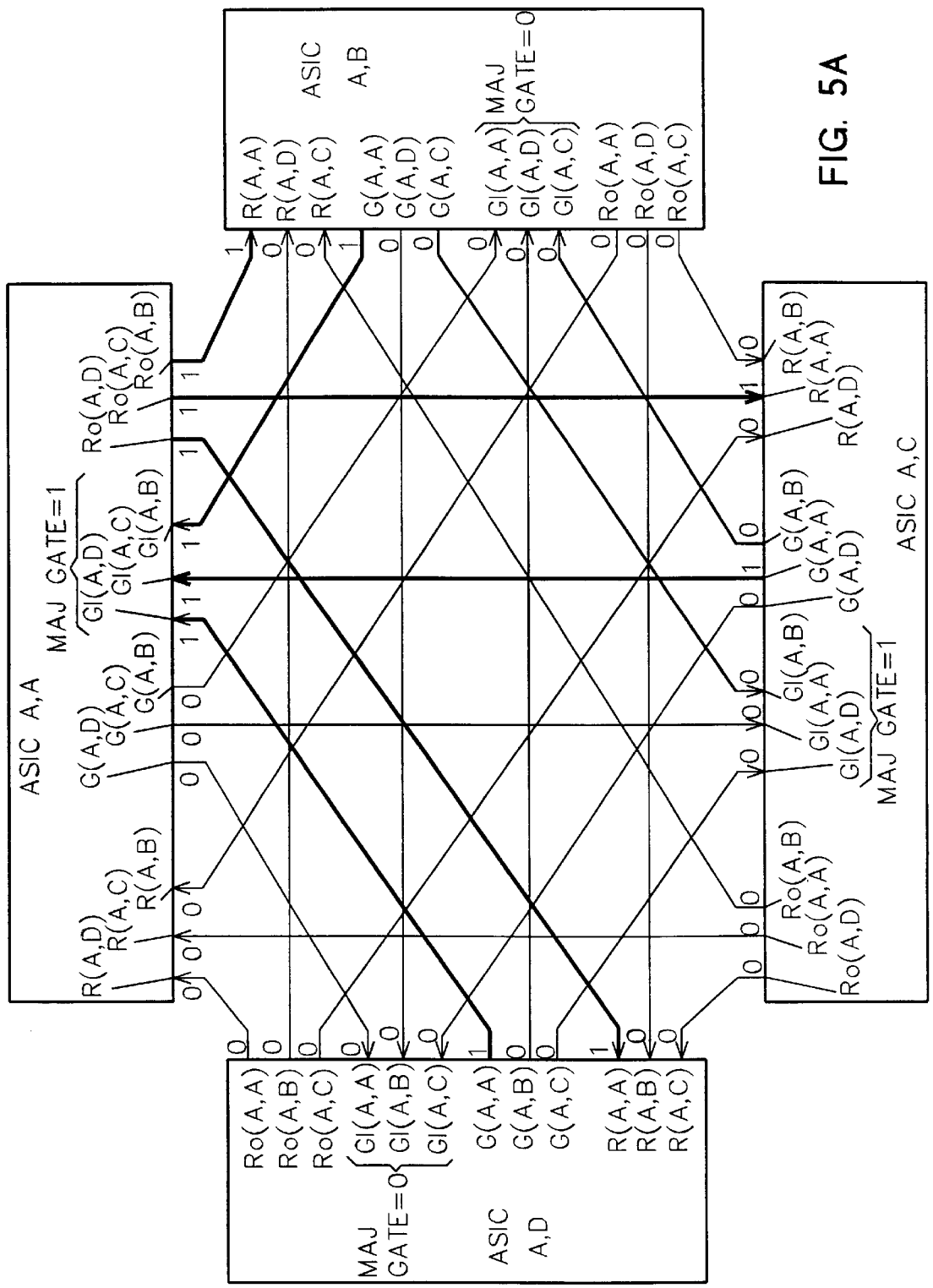
FIG. 5A–5D are block diagrams showing the plurality of the control logic sections of FIG. 3 interconnected through an arbitration bus as shown in FIG. 5, FIGS. 5A–5D showing different examples of data on wires of the arbitration bus, a logic 1 condition being indicated in FIGS. 5A–5B by heavy weight (i.e., darker) lines.

Thus, consider as a first example that the control section 50 (FIG. 3) of control logic section ASICs A,A generates an internal request for the control/data bus on line 64. Such request is executed by distributing the internally generated logic 1 to all other control logic sections ASICs A,B-D,D, here via a logic 1 produced at ports Ro(A,B), Ro(A,C) and Ro(A,D) of ASIC A,A. It is first noted that the logic 1 condition is represented in FIG. 5A by heavy weight lines. It is also noted that the logic 1 is fed to the internal arbitrator 58 (FIG. 4).

The logic 1 signal at ports Ro(A,B), Ro(A,C) and Ro(A, D) of control logic section ASIC A,A are fed to ports R(A,A) of the other control logic sections ASICs A,B; A,C; and A,D, as indicated by the heavy weight lines in FIG. 5A. Assuming that this is the first request, the bus arbitrator 58 in each of the control logic sections ASICs A,B-D,D should, if operating correctly, produce a logic 1 at port G(A,A) thereof and a logic 0 at ports G(A,D) and G(A,C) thereof. The logic 1 signal produced at ports G(A,A) of the control logic sections ASICs A,B; A,C; A,D are fed to the ports GI(A,B) GI(A,C) and GI(A,D) of control logic section ASIC A,A. The logic 1 at these ports is fed to the majority gate 56 (FIG. 4) of the arbitration section 52 in control logic section ASIC A,A. Because all three AND gates in the majority gate 56 section are logic 1, the output of the OR gate in the majority gate 56 is a logic 1 thereby producing an internal control/data bus grant on line 70 to the requesting logic control section ASIC A,A.

Figure 5B:
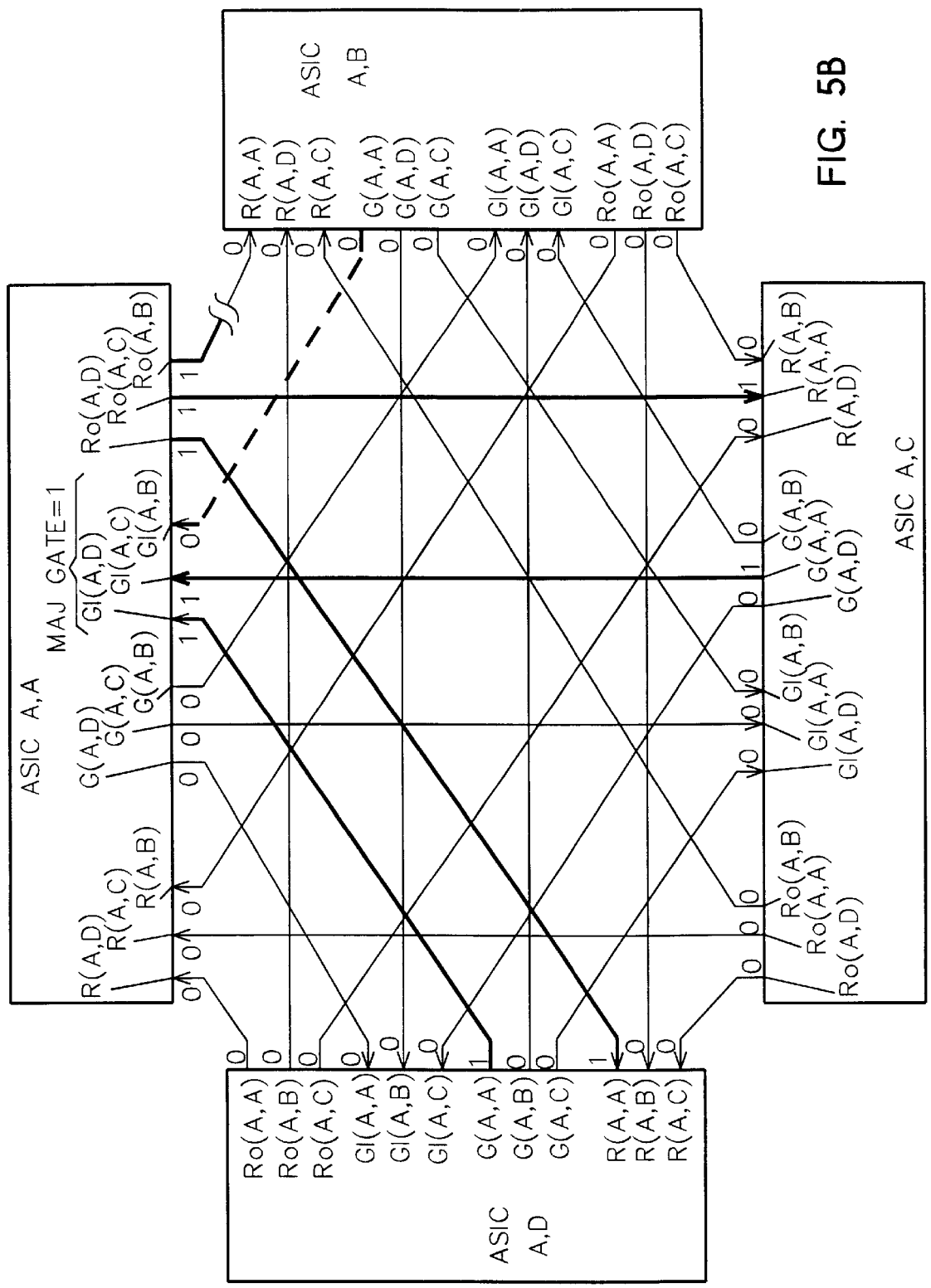

The majority gate 56 arrangement provides the bus arbitration sections 52 with a degree of fault tolerance. For example, consider the example above, except that here logic 1 signal at port Ro(A,B) of control logic section ASIC A,A is not communicated to port R(A,A) of control logic section ASIC A,B (indicated by the broken line in FIG. 5B). Thus, control logic section ASIC A,B maintains a logic 0 at port G(A,A) thereof (i.e., a logic 1 is not transmitted to port GI(A,B) of control logic section ASIC A,A) as indicated by the dotted line in FIG. 5A. However, control logic sections ASICs A,C and A,D respond properly and produce logic 1 signals at ports G(A,A) thereof. These two logic 1 signals are fed to ports GI (A,C) and (A,D) of control logic section ASIC A,A. Again the majority gate in control logic section ASIC A,A produces a logic 1 even though there is a fault with the control logic section ASIC A,A/control logic section ASIC A,B dialog.

Figure 5C:
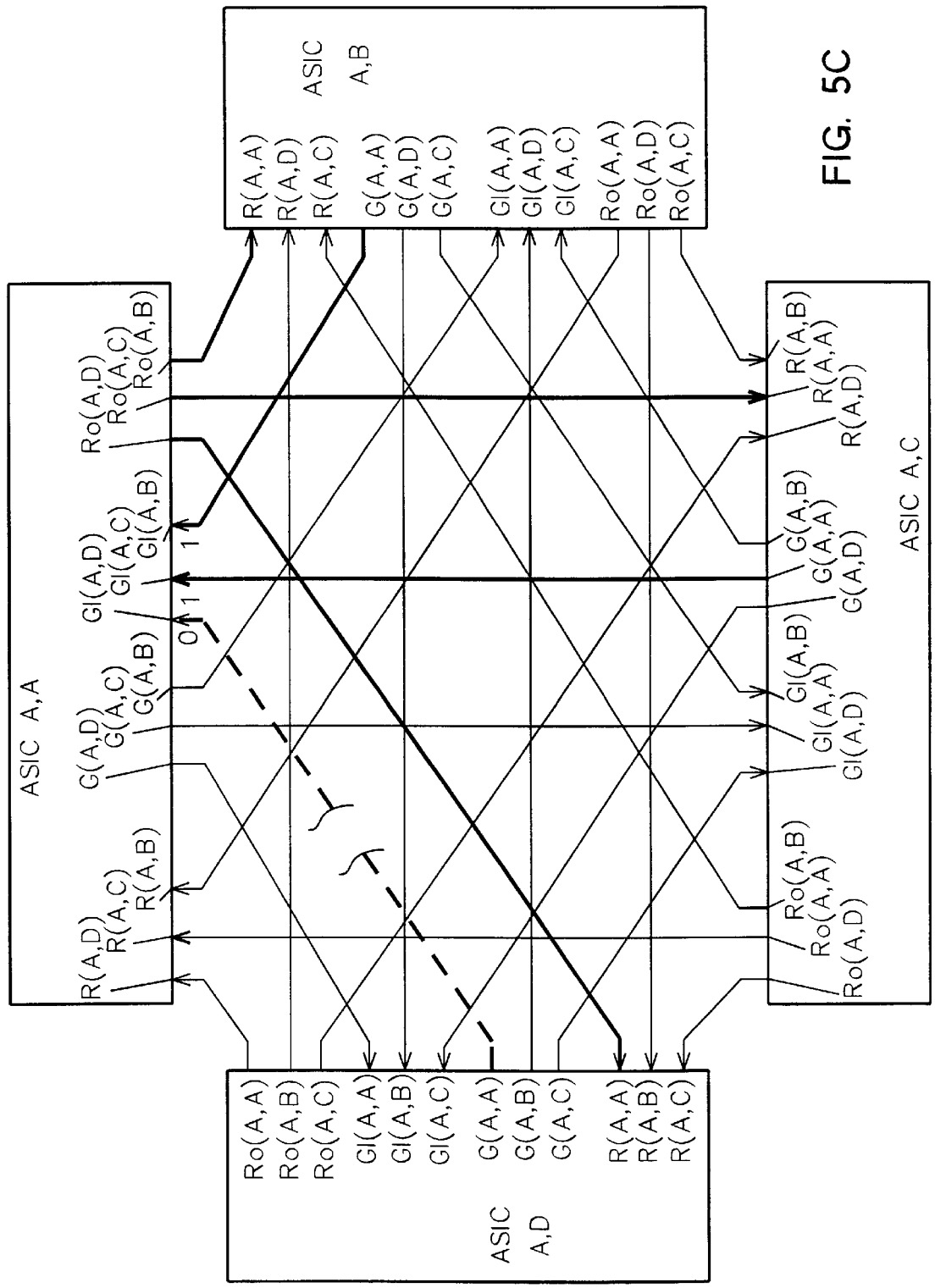
Figure 5D:
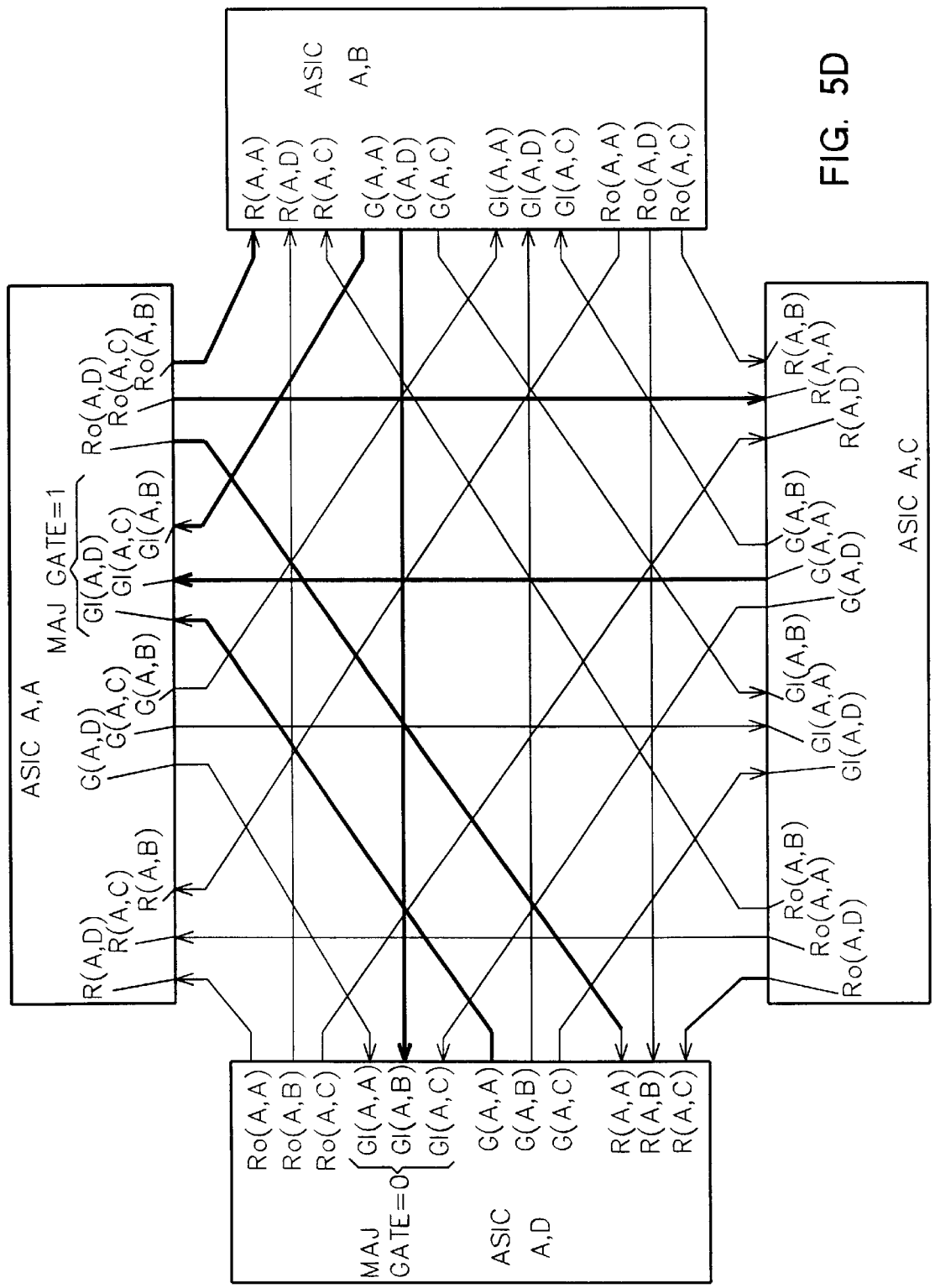

Considering the first example above, except that here logic control section ASIC A,D fails to produce a logic 1 at port G(A,A) as indicated by the broken line in FIG. 5C. Thus, the logic 1 signal at port G(A,A) of control logic section ASIC A,D is not communicated to port GI (A,D) of control logic section ASIC A,A. However, control logic sections ASICs A,B and A,C respond properly and produce logic 1 signals at ports G(A,A) thereof. These two logic 1 signals are fed to ports GI (A,C) and GI(A,B) of control logic section ASIC A,A. Again, the majority gate in control logic section ASIC A,A produces a logic 1 even though there is a fault with the control logic section ASIC A,A/control logic section ASIC A,D dialog.

Considering the first example above, except that here logic control section ASIC A,B produces a logic 1 control/data bus grant to two control logic sections; one correctly to control logic section ASIC A,A via the G(A,A) port thereof and one incorrectly by placing a logic 1 at port G(A,D) of control logic section ASIC A,B. It is noted that the majority gate of control logic section ASIC A,A will properly produce an internal control/data bus grant signal and the majority gate of the control logic section ASIC A,D will not grant a control/data bus grant because none of the three AND gates in the majority gate of control logic section ASIC A,D will produce a logic 1.

Other embodiments are within the spirit and scope of the appended claims.

What is claimed is:

1. A data storage system, comprising:
   (A) a plurality of control/data buses;
   (B) a memory section coupled to the plurality of control/data buses, such memory section, comprising:
      (i) a common memory region;
      (ii) a plurality of control logic sections interconnected through an arbitration bus, each one being coupled between a corresponding one of the control/data buses and the common memory region, each one of such control logic sections comprising:
         (a) a control logic for controlling transfer of data between the common memory region and the one of the plurality of control/data buses coupled to said one of the logic sections, such control logic producing a control/data bus request for the one of the control/data buses coupled thereto and for effecting the transfer in response to a control/data bus grant fed to the control logic; and
         (b) a bus arbitration section coupled to the arbitration bus for:
            (1) receiving a control/data bus request from the control logic in such one of the control logic sections and from the other control logic sections coupled to such arbitration bus;
            (2) for granting access to the control/data bus to one of the control logic sections in accordance with the bus requests coupled to the bus arbitration section;

(3) for receiving control/data bus grants from the other control logic sections coupled to such arbitration bus; and (4) for distributing the control/data bus request produced by the control logic in said control logic section to the other control logic sections coupled to the arbitration bus.

2. The data storage system recited in claim 1 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

3. The data storage system recited in claim 1 wherein each one of the bus arbitration sections includes an internal arbitrator response to bus request from the plurality of control logic sections and provides a bus grant to one of the plurality of control logic sections selectively in accordance with a pre-determined criteria.

4. The data storage system recited in claim 1 wherein each one of the bus arbitration sections includes an internal arbitrator response to bus request from the plurality of control logic sections and wherein each one of the plurality of control logic sections provides a bus grant to one of the plurality of control logic sections selectively in accordance with a common pre-determined criteria.

5. The data storage system recited in claim 3 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

6. The data storage system recited in claim 4 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

7. A data storage system wherein a main frame computer section having main frame processors for processing data is coupled to a bank of disk drives through an interface, such interface comprising:

(A) a plurality of control/data buses;

(B) a plurality of controllers each one thereof asserting on the control/data bus during a controller initiated bus assert interval: (a) a memory address; and (b) a command, such command including: (i) either a write operation request or a read operation request; and, (ii) when a write operation is requested during a subsequent bus grant interval, data and bus write clock pulses;

(C) at least one addressable memory section coupled to the plurality of control/data buses, such memory section, comprising:

(i) a common memory region;

(ii) a plurality of control logic sections interconnected through an arbitration bus, each one being coupled between a corresponding one of the control/data buses and the common memory region, each one of such control logic sections comprising:

(a) a control logic for controlling transfer of data between the common memory region and the one of the plurality of control/data buses coupled to said one of the logic sections, such control logic for producing a bus request for the one of the control/data buses coupled thereto and being adapted to effect the transfer in response to a bus grant fed to the control logic; and (b) a bus arbitration section coupled to the arbitration bus for:

(1) receiving a bus request from the control logic in such one of the control logic sections and from the other control logic sections coupled to such arbitration bus;

(2) granting access to the control/data bus to one of the control logic sections in accordance with the bus requests coupled to the bus arbitration section;

(3) receiving bus grants from the other control logic sections coupled to such arbitration bus; and (4) distributing the bus request produced by the control logic in said control logic section to the other control logic sections coupled to the arbitration bus.

8. The data storage system recited in claim 7 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

9. The data storage system recited in claim 7 wherein each one of the bus arbitration sections includes an internal arbitrator response to bus request from the plurality of control logic sections and provides a bus grant to one of the plurality of control logic sections selectively in accordance with a pre-determined criteria.

10. The data storage system recited in claim 7 wherein each one of the bus arbitration sections includes an internal arbitrator response to bus request from the plurality of control logic sections and wherein each one of the plurality of control logic sections provides a bus grant to one of the plurality of control logic sections selectively in accordance with a common pre-determined criteria.

11. The data storage system recited in claim 9 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

12. The data storage system recited in claim 10 wherein each one of the bus arbitration sections includes a majority gate fed by the bus grants received from the other control logic sections for producing an internal bus grant when a majority of the control logic sections indicate that the said one of the bus arbitration sections has been granted the control/data bus.

* * * * *